Feb. 27, 1951 V. K. EDER 2,543,570
THICKNESS GAUGE
Filed March 22, 1947
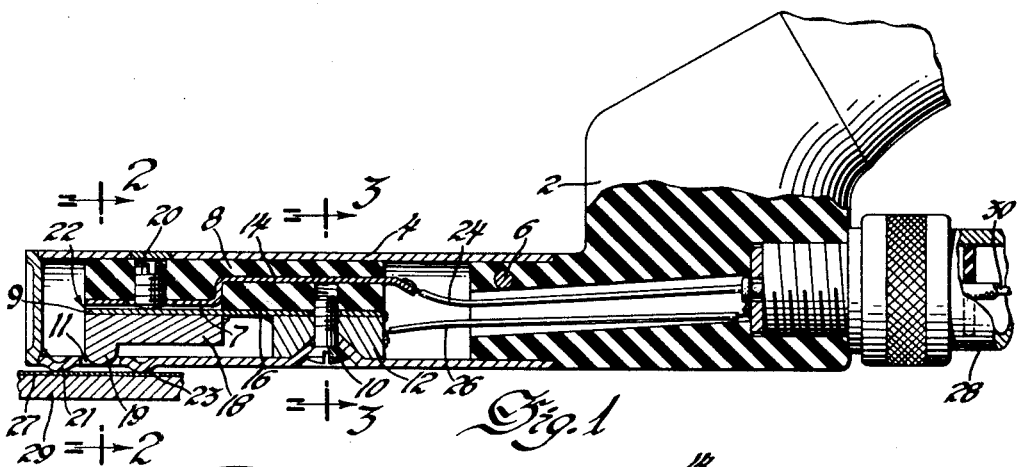
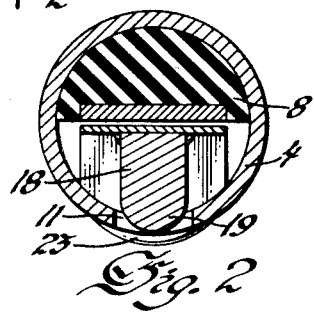
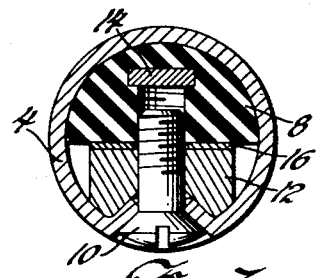
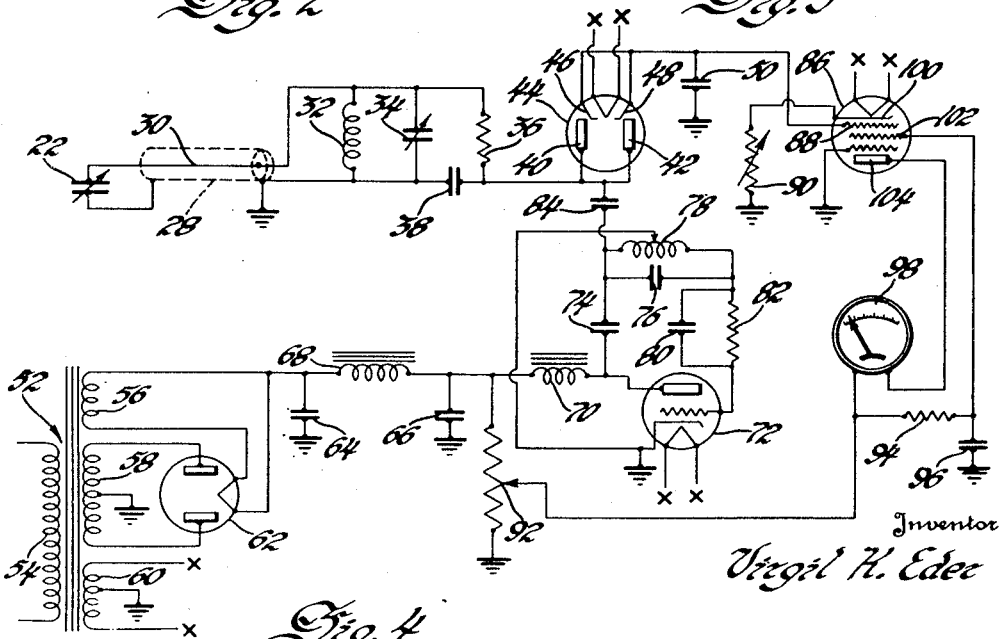
Inventor
Virgil K. Eder
By Spencer, Willets, Helmig & Baillio
Attorneys Patented Feb. 27, 1951

2,543,570

UNITED STATES PATENT OFFICE 2,543,570

THICKNESS GAUGE

Virgil K. Eder, Indianapolis, Ind., assignor to General Motors Corporation, Detroit, Mich., a corporation of Delaware Application March 22, 1947, Serial No. 736,517

6 Claims. (Cl. 175—183)

The present invention relates to a means for measuring the thickness of a non-magnetic coating on a magnetic material. More particularly it relates to an electronic means for measuring such a coating utilizing the strength of a magnetic field to vary the impedance of a reactance element.

Previous to the present invention, several different types of magnetic measuring means have been used for measuring the thickness of non-magnetic coatings. An illustration of these prior measuring means is shown in Hathaway 2,221,516 and in Tait et al. 2,320,761.

The applicant has devised a means of determining the thickness of a coating using the magnetic attraction of a permanent magnet to vary the impedance of a reactance element thereby detuning a resonant circuit. This resonant circuit may have any desired Q value and therefore may be adjusted to have the sensitivity required for the particular intended use. The applicant's device has very wide utility since it may be easily adapted to measure a wide range of coating thicknesses on surfaces of quite varied configurations. It is therefore an object of the present invention to produce an accurate, dependable, device for measuring the thickness of a non-magnetic coating on magnetic material.

It is a further object of the present invention to produce a device in which a magnetic field is produced by a permanent magnet and the attraction of the magnet by this field is used to vary the reactance of a passive electrical element and this change in reactance being used to indicate the thickness of the coating.

Other objects will become apparent upon reading the specification and inspection of the drawings and will be particularly pointed out in the claims.

In the drawings:

Figure 1 is the tool which is held in the hand of the operator and placed on the coating, the thickness of which is to be determined.

Figure 2 is a cross section through 2—2 of Figure 1.

Figure 3 is a cross section through 3—3 of Figure 1.

Figure 4 is the electronic circuit used in the present invention.

Referring more particularly to Figures 1, 2 and 3, 2 is a handle of phenolic, hard rubber, or other insulating material which is used as a handle by the operator of the device. Secured to this handle by means of a pin 6 is a tube 4 of electrical conducting material which encloses a magnetically variable condenser. One element 7 of this variable condenser 22 is rigidly secured to the tube 4 by being embedded in non-magnetic insulator 8. The other plate 9 of this condenser is made of electrical conducting material and is rigidly secured to a permanent magnet pole piece 18. The shank 16 of this condenser plate is resilient thereby allowing relative movement between the plate 7 and the magnet 18. This assembly, including plates 7 and 9 and the insulator 8, is secured to the tube 4 by means of a screw 10 and a spacer block 12 of electrical conducting material. The tube 4 has an opening 11 therein to permit the projection 19 on the magnet 18 to project therethrough. The tube 4 also has small projections 21 and 23 thereon to permit maintaining the proper relationship between the coatings being measured and the permanent magnet projection 19. This coating is illustrated as 27 and the backing plate of magnetic material is 29.

In order to prevent short-circuiting between the condenser plates 7 and 9, a small set screw 20 projects through plate 7. This set screw is insulated from the plate 7 so that no electrical circuit may be completed therethrough. The plates of this condenser 22 are connected to a coaxial cable having an inner conductor 30 and an outer conductor 28 by means of conductors 24 and 26.

Referring more particularly to Figure 4, an electronic circuit is shown including a power supply and a filter circuit therefor. This circuit includes a conventional oscillator for producing a high frequency signal. This high frequency signal is coupled across a resonant circuit and a diode rectifier. The D. C. output from the rectifier is amplified and measured by a conventional type plate current meter. This plate current meter is graduated in coating thickness quantities so as to be a direct reading instrument.

Describing more particularly this electronic circuit, the condenser 22 is connected to the electronic circuit by means of the coaxial cable conductors 28 and 30, the outer conductor 28 being grounded. This condenser therefore is placed in shunt across the tuned circuit including inductance 32 and condenser 34. This circuit is then coupled to the double diode rectifier 44 by means of coupling condenser 38 and coupling resistor 36.

52 is a power transformer having its primary 54 connected to conventional 60-cycle 115 volt power lines. This transformer has one secondary 56 which provides cathode heater current for the power rectifier 62 and a second secondary 60 which provides heater current for the other tubes in the electronic circuit. This transformer has a third secondary 58 which provides a high voltage alternating current which is rectified by a double diode 62 to obtain a high voltage pulsating current. This pulsating high voltage current is filtered by filter circuits including condensers 64 and 66 and inductances 68 and 70 to produce a high voltage direct current plate supply for the electronic tubes. The oscillator circuit includes a triode 72, a coupling condenser 74, and a tuned circuit including a condenser 76 and a tapped inductance 78. The grid circuit of the triode 72 includes a biasing circuit with condenser 80 and resistor 82. This oscillator circuit produces a high frequency signal which is coupled to the plates 40 and 42 of the double diode rectifier 44 by means of coupling condenser 84. The frequency of the signal produced by this oscillator is slightly different from the resonant frequency of the tuned circuit including condensers 22 and 34 and the inductance 32. It may thus be seen that as the resonant frequency of this latter circuit is changed the impedance encountered by the signal from the oscillator is varied. The impedance to this signal is very high when the resonant frequency of the circuit including condenser 22 is the same as the frequency of the oscillator signal being impressed upon this circuit. This impedance decreases quite rapidly as the circuit is tuned to a position considerably off resonant to this signal. The rate at which this impedance changes is a function of the Q value of this resonant circuit, the higher the Q value of this circuit the more rapid the change in the impedance offered by this circuit to the oscillator signal impressed thereon. It may therefore be seen that the higher the impedance offered to signal the greater the current produced by this signal through the diode 44. This same signal impressed on the resonant circuit through the condenser 84 is also impressed on the diode rectifier and produces a pulsating current through this rectifier and across the condenser 50. This rectified signal produces a D. C. voltage on the control grid 88 of the amplifier tube 86. This tube is of the plate current bias type and the grid bias thereon is determined by the variable biasing resistance 90. The plate voltage supply for the tube 86 is obtained from the power supply rheostat 92. This same rheostat furnishes the screen grid voltage through dropping resistor 94 and filter condenser 96. A plate current meter 98 is included in the plate voltage supply circuit. This meter is calibrated in coating thickness dimensions instead of plate current dimensions in order to be direct reading.

The operation of my invention is as follows:

Referring to Figure 1, the operator, by clasping the handle 2, places the device on the surface of the coating 27 to be measured so that the projections 21 and 23 are in contact therewith. The permanent magnet 18 sets up a field of magnetic flux between the projection 19 of the magnet, and the magnetic material 29. This circuit includes the coating 27, and an air gap. It is well-known that the permeability of non-magnetic material is for practical purposes unity or the same as air. It may thus be seen that an equilibrium will be reached by the magnetic force exerted on the magnet 18 by the above mentioned field of flux and the restraining force exerted thereon by the resilient member 16. This equilibrium will be reached when the tip of the projection 19 is a distance from the magnetic material 29. It will therefore be seen that the distance between the condenser plates 7 and 9 will vary directly as a function of the thickness of the coating 27. It is also well known that the capacitive reactance of the condenser is an inverse function of the distance between the plates of this condenser. In the present invention this change in capacity being an inverse function of the thickness of the coating, is used to control the electronic circuit.

Referring to Figure 4, this change in capacity of the condenser 22 tunes the resonant circuit including the inductance 32 and the condenser 34 to a frequency different than that produced by the oscillator. A circuit including the plates 40 and 42 and the indirectly heated cathodes 46 and 48 of the rectifier 44 plus the condenser 50 is placed in parallel across the circuit whose resonant frequency is determined by the condenser 22. It will therefore be seen that, as the impedance of this resonant circuit to the oscillator frequency increases, the current produced through the detector 44 and the voltage produced across the condenser 50 also increases. The voltage across this condenser 50 normally is less than that produced by the biasing resistor 90 and therefore this control grid 88 is negatively biased with respect to the cathode 100 of the amplifier 86.

The screen grid 102 and the plate 104 of the amplifier 86 are energized from the voltage divider 92 at the output of the power supply. The resistor 94 and condenser 96 are used in this voltage supply circuit to maintain screen grid at the proper potential below that of the plate 104. This plate receives energization from the voltage divider 92 through the meter 98. It may therefore be seen that as the potential of the control grid 88 is varied by the rectified output of the rectifier 44 that the plate current through the tube 86 and consequently through the meter 98 is varied. This meter 98 therefore indicates plate current which in turn is dependend on the potential of control grid 88, which potential is in turn dependent upon the rectified output of the detector 44. This output current in turn is dependent upon the resonant frequency of the tuned circuit which includes condenser 22 with respect to the frequency of the oscillator 72. As described earlier, the position of the plates 7 and 9 of the condenser 22 are dependent upon the thickness of the non-magnetic coating. From this may be seen that the meter 98 may be graduated to read directly the thickness of the coating 27.

It is to be understood also that although the invention has been described with specific reference to a particular embodiment thereof, it is not to be so limited, since changes and alterations therein may be made which are within the full intended scope of this invention as defined by the appended claims.

I claim:

1. In an instrument for measuring the thickness of a non-magnetic coating on a magnetic material including, a housing of conducting material, a permanent magnet resiliently supported within said housing a predetermined distance from the surface of the non-magnetic coating to be tested, said permanent magnet rigidly attached to one plate of a condenser the capacity of which is varied by the movement of said magnet, the second plate of said condenser rigidly attached to said housing, a flux path including said permanent magnet, the reluctance of which path is a function of the thickness of the non-magnetic coating to be measured, the movement of said permanent magnet being dependent on the reluctance of said flux path, and an electronic device for measuring the capacity between said plates of the condenser.

2. In an instrument for measuring the thickness of a non-magnetic coating on a magnetic material, including a housing, a variable condenser in said housing, a permanent magnet rigidly secured to and capable of causing displacement of a movable plate of said condenser, said magnet resiliently supported in the proximity of said non-magnetic coating, a path for magnetic flux, the reluctance of which is a function of the thickness of the non-magnetic coating to be measured, to thereby vary as a function of coating thickness the force of magnetic attraction tending to increase the displacement between said condenser plates against the bias action of said resilient support, electronic measuring means capable of indicating the displacement between said condenser plates and thereby indicate the thickness of said magnetic coating.

3. An instrument for measuring the thickness of a non-magnetic coating as claimed in claim 4 in which the electronic device includes a parallel tuned circuit the resonant frequency of which is varied by said condenser, an alternating current generator, the output of which is connected across said parallel tuned circuit so that the amplitude of the signal it generates is a function of the capacity of said condenser, a rectifier capable of rectifying the alternating current thus generated and an amplifier capable of measuring the rectified current with a plate current meter connected thereto capable of indicating the plate current of said amplifier and thereby determining the thickness of the non-magnetic coating.

4. In an instrument for measuring the thickness of a non-magnetic coating on a magnetic material; including a housing, a variable condenser in said housing, a permanent magnet rigidly secured to and capable of causing displacement of a movable plate of said condenser, said magnet resiliently supported in spaced relation to a non-magnetic coating the thickness of which is to be measured, a path for magnetic flux including said permanent magnet, said housing, the magnetic material backing for the coating material, the non-magnetic coating material to be measured, and an air gap, the thickness of the non-magnetic material varying the reluctance of said path of magnetic flux thus varying the force of the magnetic attraction tending to increase the displacement between said condenser plates against the bias action of said resilient support, an oscillator capable of generating a signal of predetermined frequency, a tuned circuit including said condenser plates resonant at a frequency near said first mentioned predetermined frequency and whose impedance to said oscillator frequency varies with the reactance of said condenser, means for impressing the oscillator output frequency across said tuned circuit, and means for measuring the amplitude of the signal across said circuit and thus determining the thickness of the non-magnetic coating material.

5. An instrument for measuring the thickness of a coating of non-magnetic material as claimed in claim 4 in which the means for measuring the amplitude of the signal across said tuned circuit includes a rectifier capable of rectifying said signal, an amplifier capable of amplifying the rectified signal and a meter capable of measuring the amplified signal, all connected in cascade relationship in the order named for thus indicating the thickness of non-magnetic coating.

6. An instrument for measuring the thickness of non-magnetic coating material as claimed in claim 2 in which the electronic device includes an oscillator capable of generating a high frequency signal, a tuned circuit including the two plates of the condenser across which said high frequency signal is impressed and the impedance of which is varied by the movement of said two plates, a rectifier capable of rectifying the signal impressed across this tuned circuit and a means for measuring the rectified signal and thus determining the amplitude of the signal across said tuned circuit thereby indicating the thickness of the non-magnetic coating material.

VIRGIL K. EDER.

REFERENCES CITED

The following references are of record in the file of this patent:

UNITED STATES PATENTS

| Number | Name | Date |
|---|---|---|
| 1,557,725 | Proctor | Oct. 20, 1925 |
| 1,778,653 | Wineman | Oct. 14, 1930 |
| 1,792,249 | Serduke | Feb. 10, 1931 |
| 2,033,654 | Selquist et al. | Mar. 10, 1936 |
| 2,076,944 | Howe | Apr. 13, 1937 |
| 2,123,812 | Stevens et al. | July 12, 1938 |
| 2,318,666 | Bruce | May 11, 1943 |
| 2,318,720 | Sewell | May 11, 1943 |
| 2,318,936 | Fisher | May 11, 1943 |
| 2,326,344 | Elmendorf | Aug. 10, 1943 |
| 2,373,846 | Olken | Apr. 17, 1945 |

OTHER REFERENCES

Journal of the Institute of Electrical Engineers, vol. 84, May 1939, pages 574 and 575.

Certificate of Correction

Patent No. 2,543,570                                          February 27, 1951

VIRGIL K. EDER

It is hereby certified that error appears in the printed specification of the above numbered patent requiring correction as follows:

Column 5, line 26, for the claim reference numeral "4" read *1*;

and that the said Letters Patent should be read as corrected above, so that the same may conform to the record of the case in the Patent Office.

Signed and sealed this 8th day of May, A. D. 1951.

[SEAL]

THOMAS F. MURPHY,
*Assistant Commissioner of Patents.*